3,469,715
UNLOADING DEVICE FOR BULK MATERIALS
Hyacinthe M. Bocchietti, 13 Ave. du Clos 94,
La Varenne, France
Filed Nov. 9, 1967, Ser. No. 681,658
Claims priority, application France, June 23, 1967,
111,609
Int. Cl. B63b 27/00; B65g 37/00
U.S. Cl. 214—14                                                3 Claims

ABSTRACT OF THE DISCLOSURE

A bulk material unloading device having a vertically movable and rotatable bucket-wheel mounted for lateral movement on a gantry having side frames between which a vessel to be unloaded is navigated. Once in position under the gantry, the bucket-wheel is lowered on the side frames into the hold of the vessel and is caused to rotate, moving laterally to cover the full width of the hold. The bulk material scooped up by the buckets on the bucket-wheel falls through an open side of the buckets as they reach the top of the circle through which the buckets rotate and onto a series of co-operating conveyor belts, by means of which the bulk material may be transported to a discharge point.

BACKGROUND OF THE INVENTION

This invention relates to a device for the unloading of bulk materials contained in a barge or similar vessel, whether the vessel be river-going or sea-going.

Known unloading installations using cranes or travelling grabs operate intermittently, and the output thereof is therefore relatively limited both as regards operating speed and capacity, in spite of improvements hitherto made.

The object of the invention is to provide an unloading device having a considerably higher output than that of conventional units. Extremely high outputs may be obtained due to the continuous rotation of the bucket-wheel, which works continuously to remove material.

SUMMARY OF THE INVENTION

According to the invention, an unloading device comprises a gantry having side frames located astride a waterway into which a barge or equivalent vessel may be navigated, a horizontal beam vertically movable on said side frames, a bucket-wheel having open-sided buckets, a carriage mounting said bucket-wheel for rotation about said beam in a vertical plane, said carriage being adapted for horizontal movement along said beam, a first conveyor belt carried by said beam and extending through said bucket-wheel and means for rotating said wheel, for driving said first conveyor belt, for moving said carriage on the horizontal beam, and for raising and lowering said beam.

DESCRIPTION OF THE PREFERRED EMBODIMENTS

Figure 1:
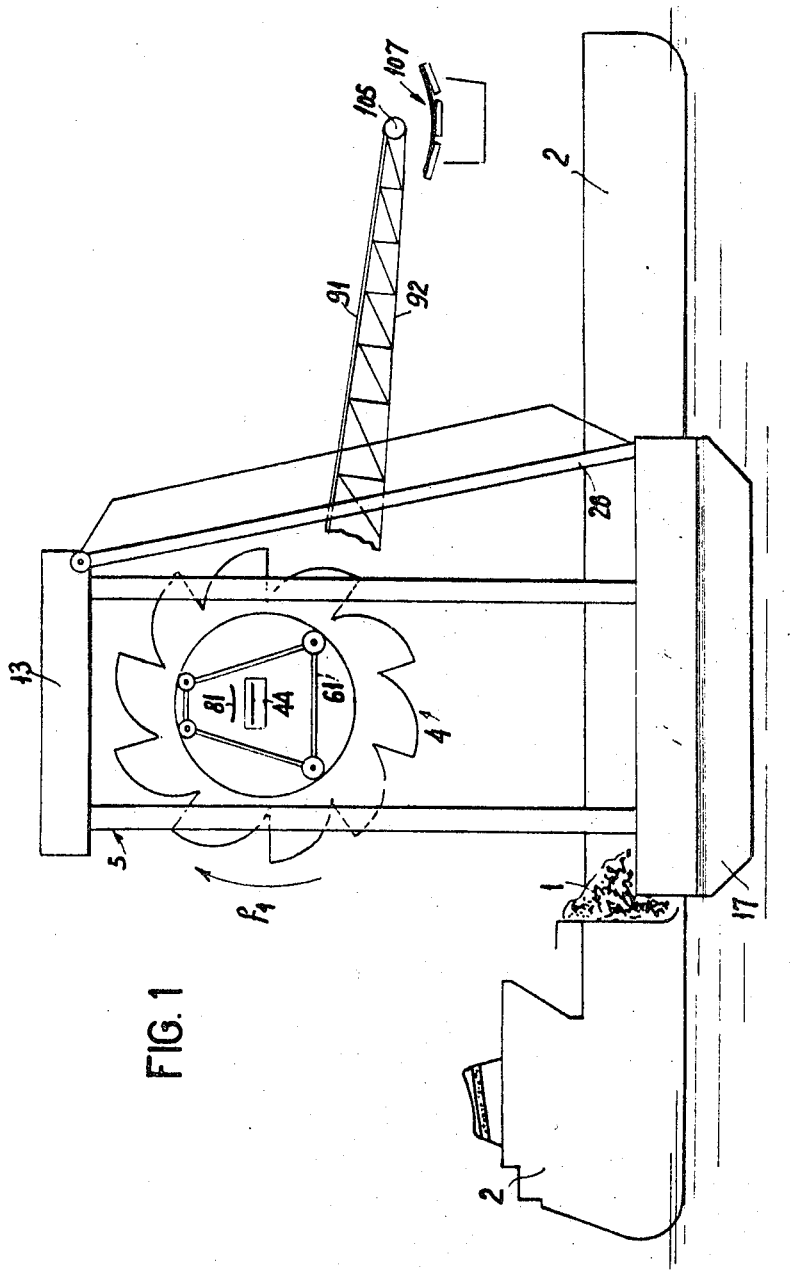
FIGURE 1 is a diagrammatic view in side elevation of the device with bucket-wheel in the raised position.

The device illustrated diagrammatically in FIGURE 1 is designed to unload bulk materials 1 from the hold of a barge or similar vessel. The device consists essentially of a bucket-wheel denoted generally 4 mounted on side frames of a gantry indicated generally at 5.

Figure 2:
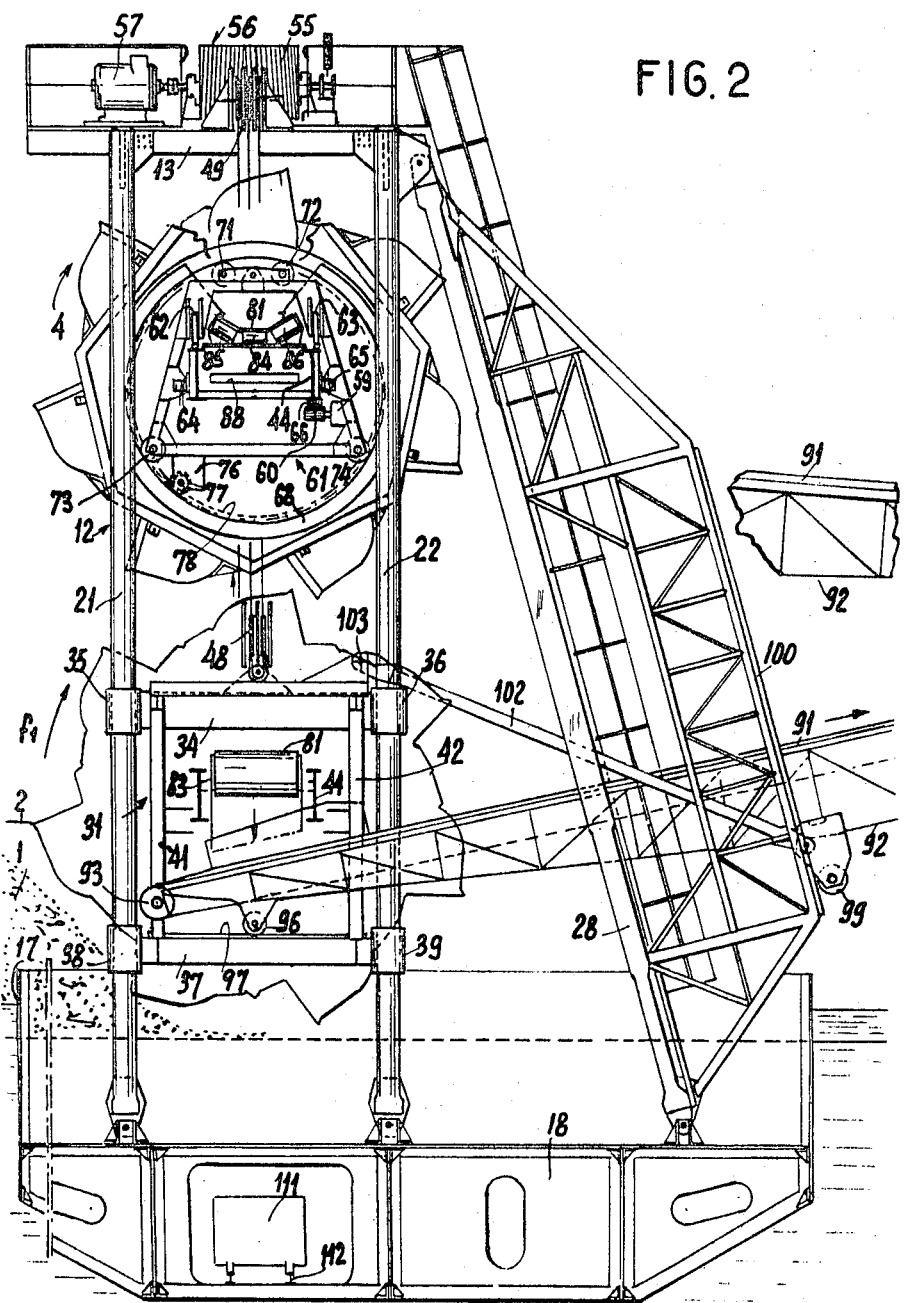
FIGURE 2 is a view in side elevation on a larger scale, of the main portion of the device illustrated in FIGURE 1 with the bucket-wheel shown both in the raised position and the operating position.
Figure 3:
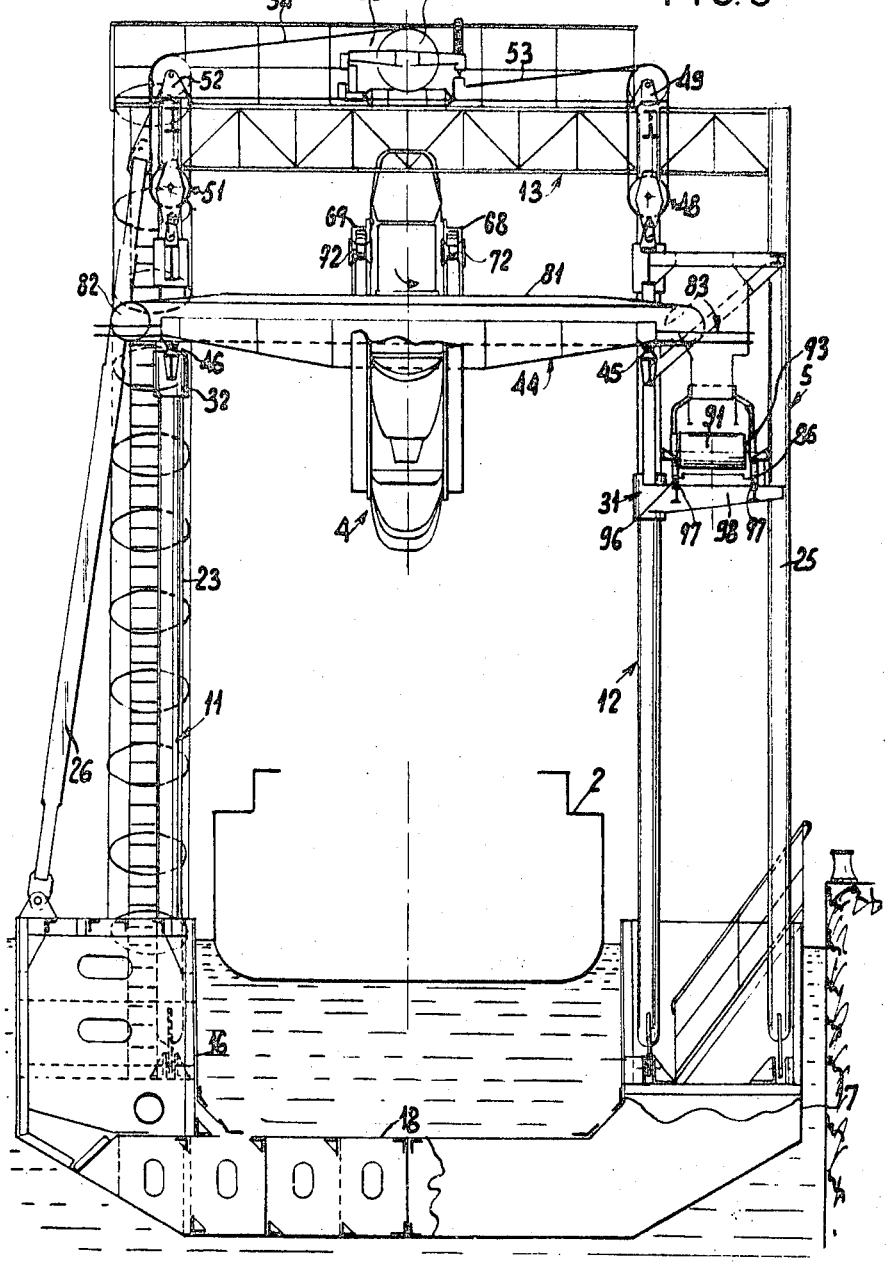
FIGURE 3 is a view in front elevation of the device shown in FIGURE 2, with the bucket-wheel shown in the raised position.

As shown in FIGURES 2 and 3, the gantry 5 includes two main side frames 11 and 12 connected at their upper ends by a cross member 13, while their lower ends rest on two floating caissons 16 and 17 which caissons are joined by a bottom portion 18 which is far enough below the water line to allow a barge 2 to enter the device between the caissons and to be positioned under the gantry and bucket-wheel. The side frame 12 includes two vertical tubes 21 and 22, and the side frame 11 is similarly provided with two vertical tubes such as the tube shown at 23 (FIGURE 3). Arranged parallel with the side frame 12 at a small distance therefrom toward the outer edge of the caisson 17 is an auxiliary vertical member 25 (FIGURE 3): this member has been omitted from FIGURE 2 for the sake of clarity.

Two lateral struts 26 (one of which is shown in FIGURE 3) adapted to brace the gantry laterally, and two longitudinal struts 28 (one of which is shown in FIGURE 2) are adapted to brace the gantry longitudinally.

A frame 31 is adapted to slide on the two vertical tubes 21 and 22 of the side frame 12, and, in a similar manner another frame 32 (FIGURE 3) may slide on the two vertical tubes of side frame 11. The frame 31 consists of the upper cross member 34 (FIGURE 2), with the two ends thereof being connected to two sleeves 35 and 36 slidably mounted on the two tubes 21 and 22, respectively, and a lower cross member 37. The two ends of the member 37 are attached to two other sleeves 38 and 39 slidably mounted on the two tubes 21 and 22, respectively, with the remainder of the frame consisting of two vertical side members 41 and 42 attached to the cross members 34 and 37. The structure of the frame 32 is similar to that of frame 31.

A horizontally disposed beam 44 of rectangular cross section rests with one end of the frame 31 on a horizontal pivot 45, while the other end of the beam rests in the frame 32 on another horizontal pivot 46. Beam 44 may be moved vertically on the side frames 11 and 12 by causing the two frames 31 and 32 to slide on the respective side frames. To this end, the frame 31 is suspended from the lower block of a block and tackle arrangement 48, and the upper block thereof is mounted on a bracket 49 attached to the cross member 13. In a similar manner, the frame 32 is suspended from the lower block of another block and tackle arrangement 51, with the upper block thereof being also attached to cross member 13. Cables 53 and 54 of these two block and tackle arrangements are wound onto a common drum 55 which forms part of a winch 56 located in the middle of the cross member 13 and which is driven by an electric motor 57.

A carriage 61 of trapezoidal cross section, as shown in FIGURE 2, is adapted to roll on the beam 44 by means of upper rollers 62 and 63 and horizontally disposed rollers 64 and 65. The carriage 61 may be moved to and fro along the beam 44 by means of any appropriate drive system. An example of such a drive system is illustrated diagrammatically in FIGURE 2 by an electric motor 59 carried by the carriage 61 and driving a toothed gear 60 in mesh with a rack 66 secured lengthwise to the beam 44.

The bucket-wheel 4 is disposed for rotation about the beam 44 and is rotatably mounted on the carriage 61 by means of two ring members 68 and 69, each of which rolls on two upper rollers 71 and 72 and two lower rollers 73 and 74 carried by the carriage 61. The bucket wheel 4 is rotated by means of any appropriate drive system. An example of such a drive system is illustrated diagrammatically in FIGURE 2 by an electric motor 76 driving a toothed gear 77 engaging with an internally toothed ring gear 78 integral with ring member 68.

The upper run flight of a first conveyor belt 81 runs on the top of the beam 44, and the lower run passes through the interior of the beam. The two end rollers carrying this belt are referenced 82 and 83 (FIGURE 3) and are located at either end of the beam 44. One of the rollers is a driving roller driven by appropriate means. The upper run of the conveyor belt 81 rests on central horizontal rollers 84 (FIGURE 2) and on lateral, inclined rollers 85 and 86 which raise the edges of the belt to prevent the material deposited by the bucket-wheel onto the belt from falling over the edges thereof. The lower run of conveyor belt 81 rests on rollers 88 distributed along the length of the interior of the beam 44.

The discharge or downstream end of the first conveyor belt 81 is located in the space between the side frame 12 and auxiliary vertical member 25 of gantry 5, as can be seen in FIGURE 3. Below the discharge end of the first conveyor belt 81 is located the loading end of a second conveyor belt 91 carried on a beam 92. Shown at 93 is one of the two end rollers carrying this conveyor belt, which may be a driving roller having appropriate drive means.

The end of the beam 92, at the loading or upstream end of the second conveyor belt 91, is carried by rollers 96 resting on two parallel and horizontal roller tracks 97 operably related to a bracket 98 which is integral with the lower part of the frame 31. An intermediate portion of the beam 92 is equipped with rollers 99 rolling on inclined tracks 100 carried by the struts 28, as shown in FIGURE 2. A brace 102 (FIGURE 2) integral with beam 92 is pivoted at 103 to the upper part of frame 31. The locations of the various elements, and the slope of tracks 100, are such that when the frame 31 moves vertically on the side frame 12 of the gantry, it carries therewith the beam 92 and the second conveyor belt 91, with the latter executing a movement such that the downstream end of the conveyor belt (the roller at which end is referenced 105 in FIGURE 1) is at a level which does not appreciably vary. This makes it possible, for instance to arrange below the discharge end of the second conveyor belt 91, a third conveyor belt 107 intended to discharge the material into cars on trucks located on the dock.

The bottom portion 18 which joins the lower parts of two floating caissons 16 and 17 encloses a counterweight 111 (FIGURE 2) moving on rails 112 parallel with the beam 44 in the direction opposite to the movement of the carriage 61 carrying bucket-wheel 4 along beam 44. To this end, the counterweight 111 is connected to the carriage 61 by an appropriate electrical, or other system (not shown).

The operation of the device is as follows:

A barge 2 to be unloaded is maneuvered under the gantry 5 while the beam 44 carrying the bucket-wheel 4 is in its raised position as illustrated in FIGURE 1. With the barge having been suitably moored, the beam 44 is lowered by means of the winch 56 until the bucket-wheel 4 reaches the material 1 to be unloaded. The bucket-wheel 4 is caused to rotate in the direction of arrow "$f_1$" (FIGURES 1 and 2), so that the material picked up by its buckets is raised, and, since the buckets are open at the side adjacent the carriage 61, falls onto the first conveyor belt 81 when the buckets reach the upper part of the wheel. When the material has reached the downstream or discharge end of the first conveyor belt 81, the material falls onto the upstream or loading end of the second conveyor belt 91, and thence to the conveyor 107 which conveyor carries it to a dockside discharge point. Regardless of the height at which the bucket-wheel 4 is operating, the upstream end of the second conveyor 91 is always below the downstream end of the first conveyor 81.

In order to pick up material over the whole width of the barge, the carriage 61 is moved progressively along the beam 44 by means of motor 59. The stability of the device as a whole is ensured by the counterweight 111, with the bucket-wheel and counterweight being moved in opposite directions so that they are at all times spaced equally from and on opposite sides of the medial longitudinal plane of the unloading device, except, of course, when they are both located centrally of the device.

It is to be understood that the invention is in no way limited to the embodiment described and illustrated, which has been given merely by way of example. Without departing from the scope of the invention, numerous modifications may be made therein, depending upon the use contemplated.

Thus, in a general manner, the device may be stationary or mobile, it may rest upon one or several docks, bridges, wharves, or it may be installed on a floating caisson or cassions, as in the example illustrated.

The method of unloading, and the general concept of the device, is largely dictated by the type of barge or other vessel to be unloaded. For example, the device may move along the barge, or it may be installed in a fixed position, in which case the barge is towed there past. The method also depends upon the destination of the material to be unloaded. Thus, the device will be in a fixed position if it is to feed a precise location at a conveyor-belt installation, but it may very well be mobile if it is desired to form an embankment on a river or if some like task is undertaken. The relative motions may be more complex, for example, when loading railway cars lined up along a dock, depending upon whether the train being loaded can be moved or not.

Finally, the unloading device may be self-propelled or it may be towed.

What I claim as my invention is:

1. An unloading device for unloading bulk materials contained in a barge or similar vessel, comprising a gantry provided with two pairs of spaced vertical tubes constituting side frames, floating caissons located astride a waterway into which a barge may be navigated and on which said side frames rest, a bottom portion joining said caissons and located sufficiently below the surface of the waterway to allow the barge to pass thereabove, a frame slidably mounted on each pair of tubes, a horizontal beam spanning the distance between said side frames, each end of the beam resting on a slidable frame on a horizontal pivot, a cross member attached to the upper ends of said tubes, power operated raising and lowering means mounted on said cross member and operably connected to each slidable frame to raise and lower the slidable frames and horizontal beam, a bucket-wheel having open sided buckets, a carriage mounting said buckets, complemental means on said carriage and beam permitting said buckets to rotate about said beam in a vertical plane, further complemental means on said carriage and beam permitting horizontal movement of said carriage along said beam, a first conveyor belt carried by and extending longitudinally of said beam through said bucket-wheel, said first conveyor belt having a discharge end located beyond one of said slidable frames, a further beam having one end thereof operably connected to said last named slidable frame, a second conveyor carried by said last named beam and having its loading end below the discharge end of the first named conveyor, the arrangement being such that vertical movement of the slidable frames carries the beam therewith whereby the discharge end of the second conveyor is at a level which does not vary appreciably, and means for rotating said wheel, driving said first named conveyor belt and moving said carriage along said horizontal beam.

2. The unloading device as claimed in claim 1 in which said side frames are adapted to roll on parallel tracks located on each longitudinal side of the waterway.

3. The unloading device as claimed in claim 2 in which said bottom portion is provided with a counter-weight capable of moving horizontally and parallel to said horizontal beam in a direction opposite to the direction of movement of said carriage along said beam.

References Cited

UNITED STATES PATENTS

| | | | |
|---|---|---|---|
| 734,974 | 7/1903 | Smith | 212—3 |
| 738,084 | 9/1903 | Titcomb | 212—3 XR |
| 3,362,546 | 1/1968 | Sale | 214—14 |

GERALD M. FORLENZA, Primary Examiner

F. E. WERNER, Assistant Examiner

U.S. Cl. X.R.

198—88; 214—13